United States Patent
Bagnasco

(10) Patent No.: US 6,558,495 B2
(45) Date of Patent: May 6, 2003

(54) DEVICE FOR THE SUSPENSION OF TIRE CARCASSES

(75) Inventor: Angelo Bagnasco, I-Magliano Alpi (IT)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 09/803,183

(22) Filed: Mar. 9, 2001

(65) Prior Publication Data

US 2001/0018946 A1 Sep. 6, 2001

Related U.S. Application Data

(63) Continuation of application No. PCT/EP99/06750, filed on Sep. 13, 1999.

(30) Foreign Application Priority Data

Sep. 14, 1998 (FR) .............................................. 98 11465

(51) Int. Cl.⁷ ............................ B29D 30/20; B66C 1/54
(52) U.S. Cl. ..................... 156/111; 156/396; 156/406.2; 211/23; 425/38
(58) Field of Search ............................... 156/406.2, 403, 156/396, 398, 421.6, 421.8, 111; 425/38, 36; 211/23, 24; 294/97

(56) References Cited

U.S. PATENT DOCUMENTS

| | | | |
|---|---|---|---|
| 2,517,889 A | | 8/1950 | Kuffler |
| 3,219,510 A | | 11/1965 | Frazier |
| 3,337,173 A | * | 8/1967 | Soderquist et al. ........... 211/23 |
| 3,393,807 A | | 7/1968 | Sylvester et al. |
| 3,945,866 A | | 3/1976 | Rudder et al. ............... 156/126 |
| 4,608,219 A | * | 8/1986 | Singh et al. .................. 425/38 |
| 4,637,644 A | | 1/1987 | Trethowan ................... 294/97 |
| 5,395,150 A | | 3/1995 | Imler et al. .................... 294/88 |

FOREIGN PATENT DOCUMENTS

FR    2116290    7/1972

* cited by examiner

Primary Examiner—Geoffrey L. Knable
(74) Attorney, Agent, or Firm—Baker Botts L.L.P.

(57) ABSTRACT

A device for the substantially vertical suspension of tire carcasses which includes a plurality of supports arranged about a lifting axis (XX'), which supports bear on the inside of a tire carcass, the supports being mobile radially relative to the lifting axis, the device further including a system having at least one spring which exerts a radial expansion force on the supports, this expansion being limited by a stop. The invention also relates to a process for building a tire in using this device.

9 Claims, 3 Drawing Sheets

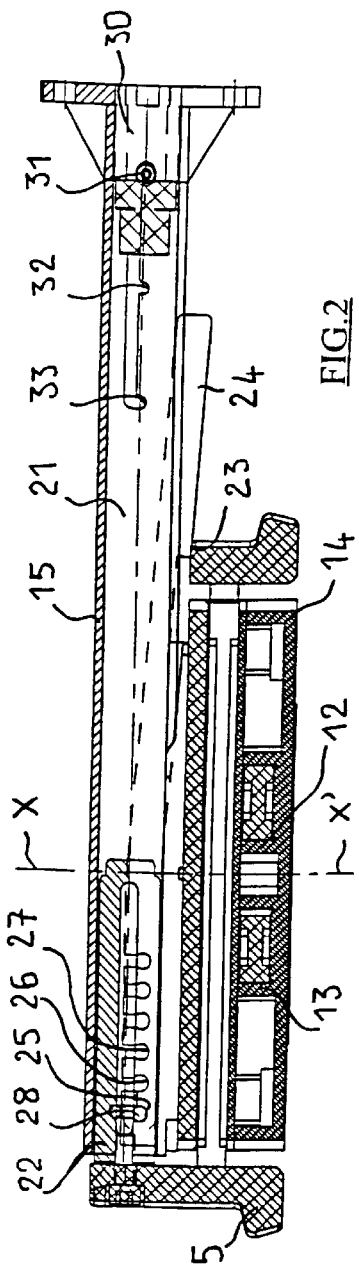
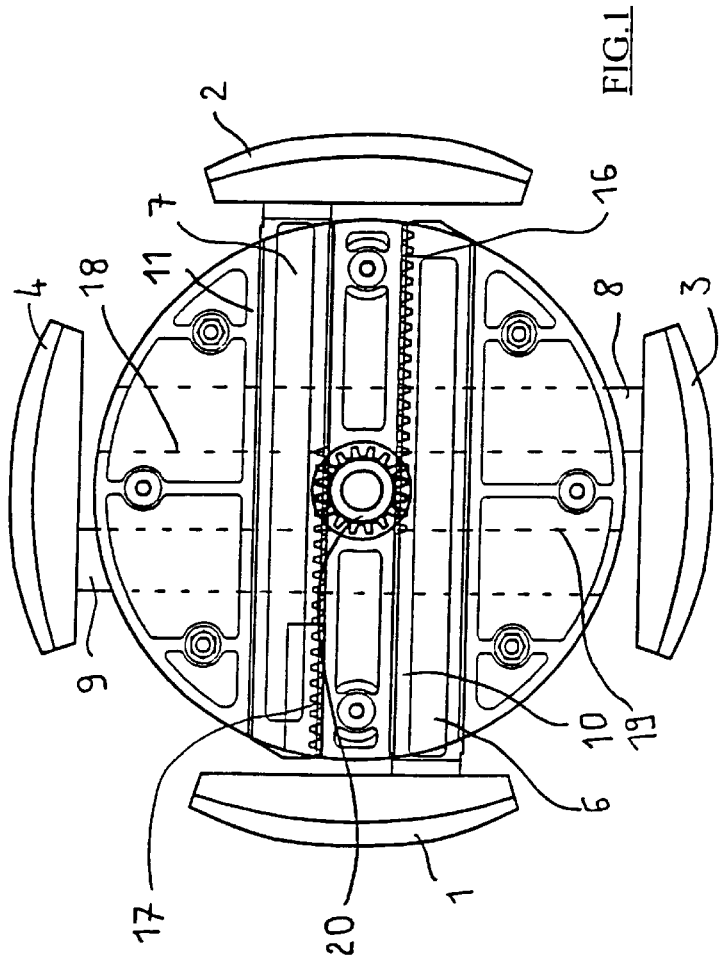

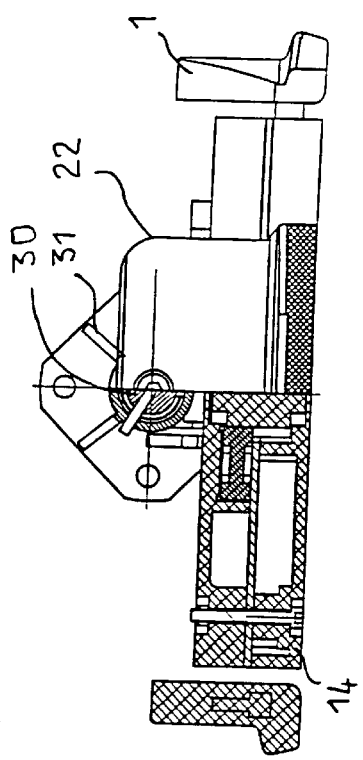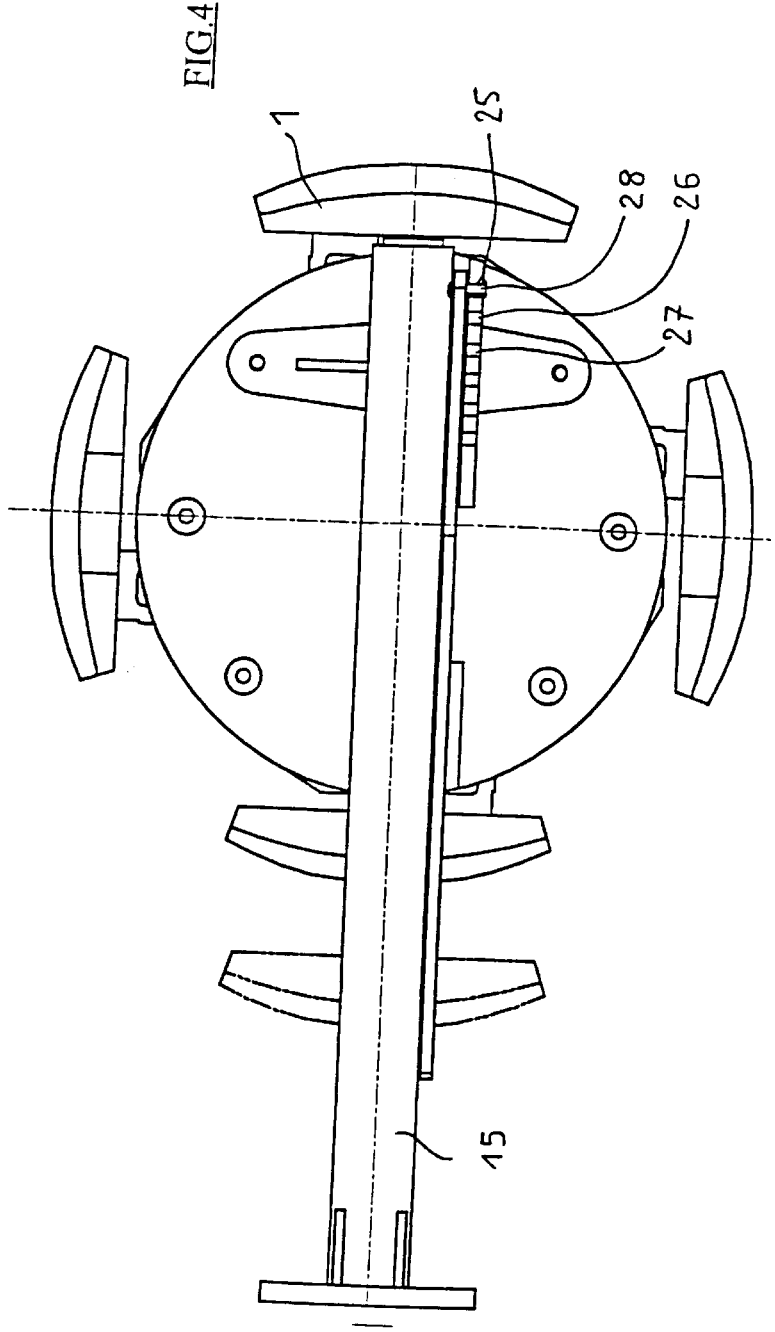

DEVICE FOR THE SUSPENSION OF TIRE CARCASSES

CROSS-REFERENCE TO RELATED APPLICATIONS

This application is a continuation of International Application No. PCT/EP99/06750 which was filed on Sep. 13, 1999 and which published in French on Mar. 23, 2000, which in turn claims priority from French Application Number 98/11465, which was filed on Sep. 14, 1998.

The subject of the present invention is a suspension device for tire carcasses; more precisely, the invention relates to a suspension device for holding uncured carcasses during manufacture of the tires, keeping their axes substantially vertical. Hereinafter, this type of suspension will be designated by the expression "vertical suspension". The invention also relates to a process for building a tire using said device.

It is known that current manufacture of radial-carcass tires can be carried out in several stages: first of all, on what is called a "first-stage" machine, or alternatively a "building" machine, on which the carcass proper is constructed from bead wires and a cylinder of uncured rubbers which is shaped to make it toroidal; then, on what is called a "second-stage" machine, or alternatively a "finishing" machine, on which a cylindrical crown reinforcement, or belt, and a tread are applied to this carcass; finally, the entire unit is vulcanised in a mold.

In this method of manufacture, between the two main stages described above, it is necessary to store or possibly transport the uncured carcass from the building machine to the finishing machine, in a state in which it is highly deformable, since the rubber is in the plastic, non-vulcanised, state. Formerly, the carcasses were attached to brackets, the axes of the carcasses being horizontal, but, under the effect of their own weight they became deformed into an oval; then the carcasses were laid flat, their axes being vertical. However, with the increase in the weight of tires, it was noted that the upper sidewall sags.

Devices were therefore conceived to avoid this deformation. Thus U.S. Pat. No. 4,452,655 describes a support means for an uncured tire carcass comprising two beads, with its axis vertical. This elliptical support means comprises four vertical plates capable of accepting a certain elastic flexion which enables them to engage beneath the upper bead in order to hold the carcass, the plates being distributed over the two minor arcs of the ellipse.

The carcass is thus held on the support by the plates bearing against said carcass beneath the upper bead, the carcass opposing radial extension of the plates. The thrust forces exerted on the carcass, which are irregularly distributed over the circumference of the carcass owing to the elliptical shape of the support means, risk causing deformation of the carcass.

Furthermore, the support means, in order to be able to accept carcasses of different dimensions, utilizes the flexibility of the plates, which indicates that carcasses of smaller dimensions are subject to greater stresses and hence greater risks of deformation. In order to avoid this phenomenon, each tire dimension requires a corresponding size of the device, which is therefore no longer multidimensional.

Finally, the operation of unloading the carcass is complicated, and cannot be automated. In fact, it is necessary to displace the carcass transversely and tilt it in order to disengage one of its sides, then to bring it back in the opposite direction in order to disengage the other side and thus free the whole carcass.

Note that "carcass" designates the raw blank that results from the operations performed in the first stage.

The present invention is directed at overcoming all these disadvantages.

SUMMARY OF THE INVENTION

In order to do this, the invention proposes a device for the substantially vertical suspension of tire carcasses, comprising a plurality of supports distributed about a lifting axis XX', which are mounted on a handling plate and are able to bear on the inside of a tire carcass, the supports being mobile radially relative to the suspension axis between at least one retracted loading/unloading position for the carcass and at least one spread-apart holding position for the carcass, said device comprising a system having at least one spring which exerts a radial expansion force on the supports, this expansion being able to be limited by a stop which limits the radial stroke of the supports.

Such a device makes it possible to limit the radial force exerted on the carcasses. This makes it possible to optimize the uniformity of the tire. The steps of loading and unloading the carcass are particularly easy to perform, and lend themselves well to automation.

The limitation of the expansion of the arms and the form of the supports enable the carcass to be put in place and, more precisely, the upper bead of the carcass, the latter being submitted with its axis vertical, to be allowed to pass over the supports in order to position it without the bead being subjected to the stress exerted by the spring during this displacement. Since the putting in place of the carcass then disengages the stop, the supports can come to bear on the carcass beneath the upper bead.

Advantageously, the stop is arranged on an actuating lever. This actuating lever is capable of being actuated, in order to disengage said stop, by the putting the carcass to be suspended on the device.

This arrangement with the lever greatly facilitates putting the carcass in place since the passage of the supports into the spread-apart position for holding the carcass is controlled automatically by simply putting the carcass in place.

The radial stroke of the supports permitted by said stop is preferably adjustable, the adjustment of the stroke being effected by modifying the distance of the stop relative to the lifting axis XX'.

This characteristic makes it possible to suspend carcasses of different dimensions on the same device. The operator merely has to adjust the distance of spreading of the supports according to the diameter of the carcass to be suspended.

Furthermore, the tension of the spring is advantageously adjustable.

Thus, the force to which the carcass is subjected is adjusted, according to the type of product being manufactured and its dimensions, so as to ensure the integrity of the carcass. It is thus possible to provide for the expansion force which is exerted on the supports to be substantially the same whatever the dimension of the carcass to be suspended.

Advantageously, the supports are distributed regularly relative to the vertical axis and comprise respectively a bearing surface intended to be in contact with the carcass to be suspended, the envelope of these bearing surfaces forming a substantially cylindrical surface. Thus the forces exerted by the supports on the carcass to be suspended are distributed substantially uniformly over the circumference of the latter.

According to an advantageous variant, the radial displacements of the supports are controlled by at least one connecting-rod articulated on one hand to the supports and, on the other hand, to a ring which slides along the axis of suspension XX'. It is then possible to provide a piston-cylinder unit which makes it possible to bring the supports towards the suspension axis XX' by displacing the ring.

Such a variant lends itself particularly well to automation.

According to another aspect of the present invention, there is provided a device for the substantially vertical suspension of tire carcasses, comprising an assembly provided with at least two supports which are distributed about a lifting axis X-X', which are mounted on a handling plate and are able to bear on the inside of a tire carcass, the supports being mobile radially relative to the lifting axis between at least one retracted loading/unloading position for the carcass and at least one spread-apart holding position for the carcass, each of the supports being associated with a sliding rack arm which cooperates with a toothed wheel borne by the handling plate, said wheel coordinating the translational movements of said arms so as to move them apart from or towards the lifting axis XX' simultaneously.

Such an arrangement makes it possible to use, for example, a single spring which can act on two, four or even more supports. Although it is advantageous to arrange the supports in pairs, it is also possible to use an uneven number of supports. These are then preferably distributed uniformly around the suspension axis.

According to another aspect, the invention also provides for a process for building a tire, comprising the steps:
 performing a first stage of producing a carcass;
 arranging said carcass on a suspension device having mobile supports on which said supports have been positioned beforehand in the retracted position;
 positioning said supports in the spread-apart position, against the inner walls of the carcass;
 disengaging said carcass from said suspension device by positioning said supports of the device in the retracted position;
 carrying out a second stage of arranging on said carcass at least the finishing elements in order to produce a tire;
 vulcanising the tire thus produced.

This process is particularly advantageous since it makes it possible to optimize the uniformity of the tire. The radial mobility of the supports makes it possible to place and remove the carcass very simply, inexpensively and ergonomically. The simultaneous bringing together of the arms in fact makes it possible to achieve a retracted position of the arms in which the latter are no longer in contact with the carcass, which permits easy and simple loading and/or unloading of said carcass.

This process furthermore lends itself well to automation.

In order for the suspension device to be multidimensional, the radial distance of the stop of the lever from the vertical axis is adjustable according to the dimension of the carcass to be suspended.

Other characteristics and advantages of the invention will become apparent on reading the examples of embodiments of the suspension device for tire carcasses according to the invention, which are given in non-limitative manner.

DESCRIPTION OF THE DRAWINGS

FIG. 1 is a horizontal sectional view of the device in its rack variant;

FIG. 2 is a front sectional view of the device of FIG. 1;

FIG. 3 is a side view in partial section of the same device;

FIG. 4 is a top view of the same device;

DESCRIPTION OF PREFERRED EMBODIMENTS

Figure 5:
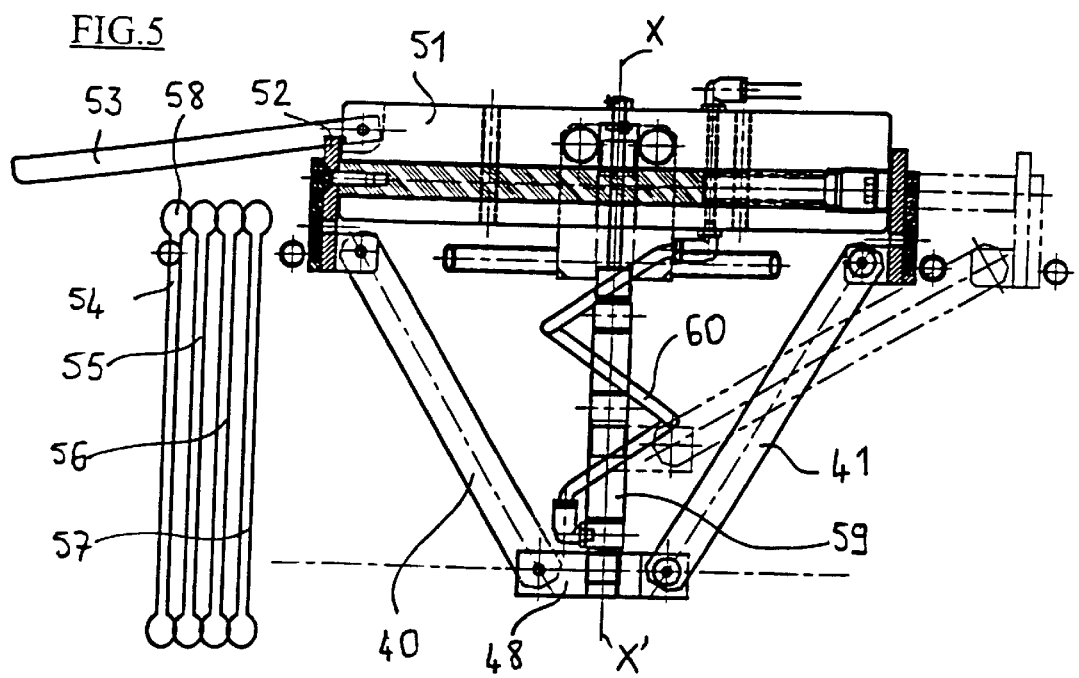
FIG. 5 is an elevation of the device in its connecting-rod variant.

In FIG. 1, the suspension device comprises four supports in the form of rigid shoes 1, 2, 3 and 4, having outer cylindrical surfaces arranged about a vertical axis. These shoes are intended to serve as supports for an uncured tire carcass (not shown) arranged with its axis vertical. Each shoe has a projecting flange 5 (FIG. 2) which is positioned beneath a bead of the carcass to be suspended, which bead will be referred to as the upper bead, the carcass being presented with its axis vertical. In order to coincide with the shape of the carcass, the envelope of the outer surfaces of the shoes 1, 2, 3, 4 forms a substantially cylindrical surface. The vertical suspension axis is designated XX'.

According to the invention, each shoe is integral with an arm 6, 7, 8 and 9, respectively, which can be displaced within a slideway, only the slideways 10 and 11 cooperating with the arms 6 and 7 being shown, which slideways are formed in a rigid handling plate 14. This plate is fixed horizontally beneath a bracket 15. This bracket forms part of a conveyor of known type, not shown. In a first variant of the invention, each arm has a rack 16, 17, 18 and 19, respectively which meshes with an axial toothed wheel 20.

A spring 21 shown compressed within the bracket 15 exerts an expansion force on the shoe 1 by means of an extension 22 of the latter; this force transmitted by the arm 6 to the toothed wheel 20 is thus exerted on all the arms 6, 7, 8, 9 and tends to move them apart radially. This expansion is limited by a stop formed by a shoulder 23 of a mobile lever 24 which blocks the radial displacement of the shoe 2, and therefore of all the shoes.

When the uncured carcass is presented, slightly inclined relative to the position in which its axis is vertical, beneath the bracket, it begins by pushing away one of the shoes, and therefore all the others, towards the axis XX', in a retracted position, then by mounting the carcass vertically, the latter raises the lever 24, which disengages the stop 23 from the shoe 2; this enables the four shoes to move apart radially simultaneously and to come to bear on the inside of the carcass, beneath its upper bead, or, preferably, at the level of the reinforcement of the armature of this bead.

The invention makes it possible to adapt the device easily to different dimensions of carcasses; for this, the radial distance of the stop 23 having the vertical axis XX' can be modified by displacing the point of articulation of the lever 24; to this end, grooves 25, 26, 27, etc. provided in the end of the bracket 15 make it possible to receive a pin 28 which is integral with the lever 24, said pin forming the axis of rotation of the lever 24. This pin 28 is engaged in that one of the grooves which makes it possible to obtain the radial distance between the stop 23 and the axis XX' corresponding to the desired extension of all the shoes.

Likewise, the position of the spring 21 can be controlled according to the dimension of the carcass; for this, an end plug 30 bears a pin 31 which can be engaged in grooves 32, 33 in the bracket 15, and thus enable the elongation of the spring 21 to be exerted correctly. Thus, it is possible to adjust the force which the spring exerts on the carcass, according to the dimension of the latter, whether small or large, by means of the shoes 1, 2, 3, 4.

In order to unload the carcass, it is enough to push away one of the shoes manually or to provide an actuating member (not shown) which acts manually or in motorized manner on one of said shoes, in order to return this shoe to its initial position, all of the shoes 1, 2, 3 and 4 then being returned to the retracted position. The carcass can therefore be disengaged from the suspension device without any difficulty, the unloading thereof furthermore involving the lowering of the lever 24, the shoulder 23 of which again blocks the radial expansion of the shoes 1, 2, 3 and 4 by action on the shoe 2.

Figure 6:
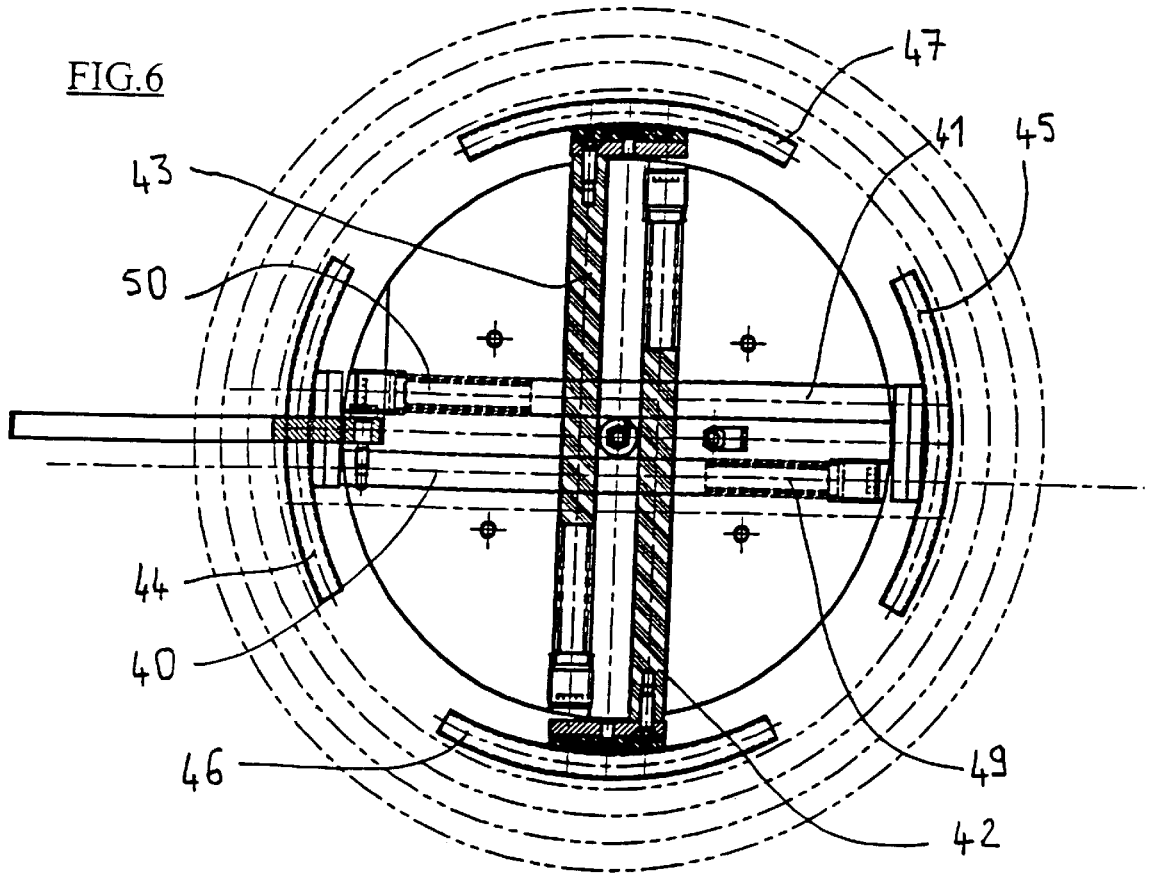
FIG. 6 is a top view in partial section of the device of FIG. 5.

In another variant of the invention, illustrated in FIGS. 5 and 6, the mechanical means for coordinating the movements of the arms in their slideways are formed by connecting-rods 40, 41, 42 and 43, the upper ends of which are articulated to the shoes 44, 45, 46 and 47 for supporting the carcass, while their lower ends are articulated on a ring 48 which can slide along the vertical axis XX'.

The coordinated radial expansion of the four shoes is controlled by four compression springs, such as 49 and 50, mounted in a rigid handling plate 51; this expansion is limited by a stop 52 formed by a shoulder of a lever 53; the latter is raised by the lifting of the uncured carcass which is to be suspended, the effect of which is to disengage the shoulder 52 relative to the shoe 44. On the right half of FIG. 5, there can be seen the spread-apart position of the shoes and the connecting-rods, shown in dot-dash lines.

On the left-hand half of FIG. 5, there can be seen four carcasses 54, 55, 56 and 57 of different diameters, for example 13, 14, 15 and 16 inches. Of course, these examples are given merely by way of illustration and are not intended to limit the scope of the invention to these ranges of dimensions. According to the invention, the simultaneous expansion of the four shoes 44, 45, 46 and 47 beneath the upper bead 58 of the carcass presented when rising makes it possible to suspend it, with its axis vertical, without deforming it.

A hydraulic or pneumatic piston-cylinder unit 59 supplied by a flexible tube 60 makes it possible to bring all the shoes and connecting-rods into their retracted positions, by moving the ring 48 downwardly, and by compressing the four springs which control the expansion of the shoes. The carcass can therefore be easily unloaded from the suspension device.

Of course, this operation of returning to the retracted position can be effected manually in a simplified version of the invention: it is enough to pull the ring 48 downwards until the shoe 44 returns to stop beneath the shoulder 52 of the lever 53.

I claim:

1. A device for the substantially vertical suspension of tire carcasses, comprising a plurality of supports arranged about a lifting axis XX', which supports are mounted on a handling plate and are able to bear on the inside of a tire carcass, the supports being mobile radially relative to the lifting axis between at least one retracted loading/unloading position, said device further comprising:

a system having at least one spring which exerts a radial expansion force on the supports which causes a radial expansion of the supports, the radial expansion of the supports being limited by a stop in the retracted position, and a lever for actuating the stop, the supports expanding from the retracted position to a spread apart holding position when the stop is disengaged.

2. A device for the substantially vertical suspension of tire carcasses according to claim 1, in which said lever is actuated to disengage said stop by the putting the carcass to be suspended in place on the device.

3. A device for the substantially vertical suspension of tire carcasses according to claim 1, in which the radial expansion of the supports permitted by said stop is adjustable.

4. A device for the substantially vertical suspension of tire carcasses according to claim 3, in which the adjustment of the expansion is effected by modifying the distance of the stop relative to the lifting axis XX'.

5. A device for the substantially vertical suspension of tire carcasses according to claim 1 including means for adjusting the tension of the spring.

6. A device for the substantially vertical suspension of tire carcasses according to claim 1, comprising an assembly of at least four supports, each being associated with a sliding rack arm, cooperating with a toothed wheel borne by the handling plate, said wheel coordinating the translational movements of the arms so as to move them apart or to bring them towards the lifting axis XX' simultaneously.

7. A device for the substantially vertical suspension of tire carcasses according to claim 1, in which the radial displacements of the supports are controlled by at least one connecting-rod articulated, on one hand, to the supports and, on the other hand, to a ring which moves along the lifting axis XX'.

8. A device for the substantially vertical suspension of tire carcasses according to claim 7, including a piston-cylinder unit for moving the supports towards the lifting axis XX' by displacing the ring.

9. A process for building a tire, comprising:

performing a first stage of producing a carcass comprising an upper bead, arranging said carcass on a suspension device having mobile supports maintained by a stop in a retracted position;

positioning said supports in a spread-apart position, against the inner walls of the carcass, by raising a lever with the upper bead of the carcass, wherein the stop is disengaged and the expansion of the supports is released, disengaging said carcass from said suspension device by positioning said support in a retracted position;

arranging on said carcass at least the finishing elements in order to produce a tire; and vulcanizing the tire.

* * * * *

UNITED STATES PATENT AND TRADEMARK OFFICE
CERTIFICATE OF CORRECTION

PATENT NO. : 6,558,495 B2
DATED : May 6, 2003
INVENTOR(S) : Bagnasco

It is certified that error appears in the above-identified patent and that said Letters Patent is hereby corrected as shown below:

Title page,
Item [56], References Cited, OTHER PUBLICATIONS, insert
-- English Abstract of JP 58122841 --

Signed and Sealed this

Twenty-fifth Day of November, 2003

JAMES E. ROGAN
*Director of the United States Patent and Trademark Office*